Jan. 30, 1962   L. G. PENDER, SR   3,018,530
FASTENING INSTALLATION
Filed July 23, 1959
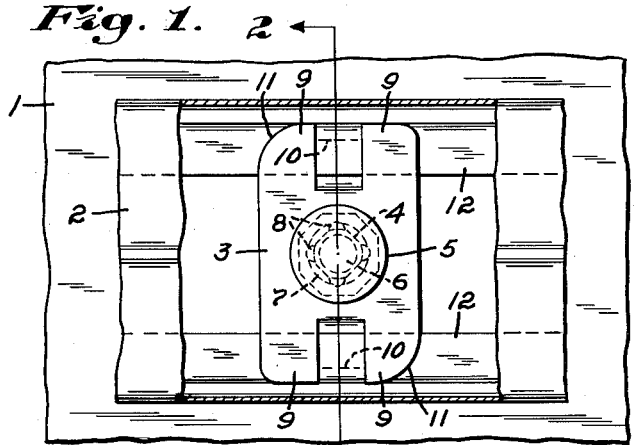
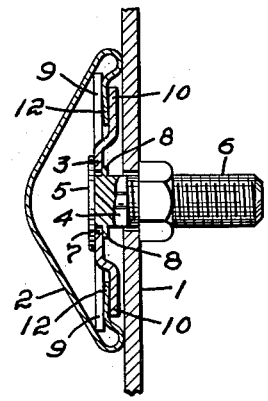
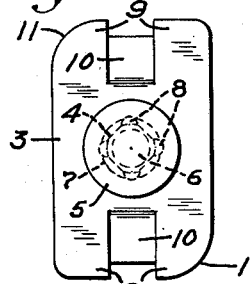
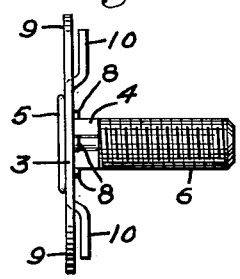
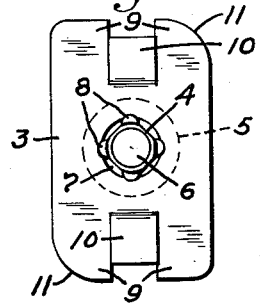
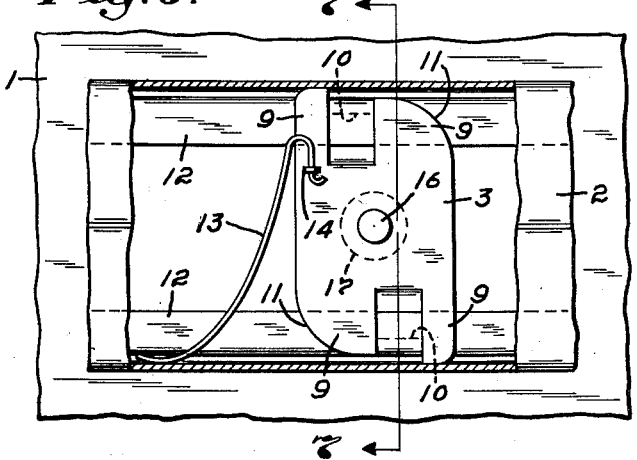
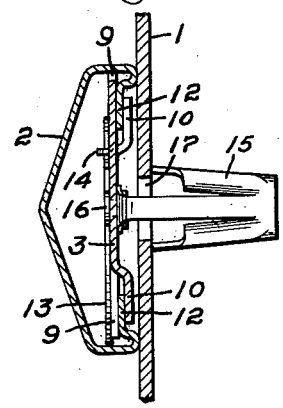
Inventor:
Lloyd G. Pender Sr,
by Walter P. Jones
Atty.

United States Patent Office 3,018,530
Patented Jan. 30, 1962

3,018,530
FASTENING INSTALLATION
Lloyd G. Pender, Sr., Detroit, Mich., assignor to United-Carr Fastener Corporation, a corporation of Delaware
Filed July 23, 1959, Ser. No. 829,033
3 Claims. (Cl. 24—73)

My invention aims to provide improvements in molding fastener installations which include a support, of any suitable construction such as a motor vehicle body, a trim molding applied to the support and fastening means securing the molding to the fastener.

An object of my invention is to provide fastening means particularly useful for securing a so-called high crown molding to a support so that the fastener will not back up into the molding when the molding is being pushed into position.

Another object of my invention is to have a plate like portion as a part of the fastener with molding flange engaging fingers for engaging opposite sides of inturned flanges of the molding. In this connection I provide the inturned flanges of the molding in such shape that portions thereof are recessed into the molding so that the fingers of the platelike portion will not interfere with a molding resting tightly against the support.

In the drawings which illustrate preferred embodiments of my invention:

FIG. 1 is a plan view, partly in section and of enlarged scale, illustrating one embodiment of my improved installation;

FIG. 2 is a section partly in elevation taken on the line 2—2 of FIG. 1;

FIG. 3 is a top plan view of a fastener with my improved plate like portion;

FIG. 4 is a side elevation of the fastener shown in FIG. 3;

FIG. 5 is a bottom plan view of the fastener shown in FIGS. 3 and 4;

FIG. 6 is a plan view of a second form of my invention, partly in section and with a higher crown molding; and FIG. 7 is a section taken on the line 7—7 of FIG. 6, the fastener in this case having a snap-in portion.

Previously known and used molding fasteners have not worked well in so-called high crown moldings because the plate portions fitting into the moldings would back up into the crown. To overcome this objection, extra "trolley like" portions or special shaped plate portions had to be provided to rest against the crown. Since the shape and height of the crowns vary, fasteners had to be adapted to these conditions resulting in many variations and more expensive constructions.

My improved constructions, as illustrated by the drawings, overcome these objections because the fasteners are provided with fingers that hold onto the inturned flanges of the molding, without regard for shape, where the previously known fasteners merely fitted into the moldings inside the inturned flanges.

Referring now to the embodiment of my invention illustrated in FIGS. 1 through 5 inclusive, I have shown a support 1, a molding 2 and a fastener, in this case, a bolt like fastener means. The fastener means selected for illustration has a relatively strong plate like portion 3 which is attached to the support 1 in any suitable manner. However, I have shown it attached by a bolt 4 having a head 5 on one side of the plate 3 and a threaded shank 6 passing through a hole 7 in the plate and staked into assembly therewith by shaved over portions (FIG. 2).

The plate like portion 3 is preferably made of heavy metal stock for strength and it is preferably of oblong shape with its longest spaced apart edges provided with a pair of upper fingers 9—9 and a centrally located lower finger 10. One of each of the pairs of upper fingers 9—9 has a curved edge 11 for purposes to be described.

While the fastening means just described may be attached to the inturned opposed flanges 12—12 of the molding 2, by endwise insertion into the molding, I prefer to enter the plate like portion 3 between the flanges 12—12 and then rotate the fastener 90° past the curved edges 11 to the position shown in FIG. 1. It will be noted that the inturned flanges 12—12 have portions spaced inwardly of the molding so that the fingers 9 and 10 may engage opposite sides and not interfere with the molding resting directly against the surface of the support, as shown in FIG. 2. In this case the threaded shank 6 of the bolt 4 has been passed through an aperture in the support 1 and a nut tightened into place to complete the assembly.

Referring now to the particular form of my invention shown in FIGS. 6 and 7, I have shown a fastening means which has a plate like portion 3 substantially like the plate like portion shown in FIG. 1 and to this is added a yieldable finger 13 which is assembled to the plate like portion through a suitable holding ear 14.

It will be noted that the fastener shown in FIGS. 6 and 7 has a spring stud portion 15 to take the place of the bolt of the first described fastener and this fastener stud 13 is secured to the plate like portion 3 by a suitable rivet 16.

When the plate like portion 3 has been turned into position as shown in FIG. 7, two opposed fingers 9—9 engage the side wall of the molding 2 (FIG. 6) and therefore, a plate cannot be turned beyond that position and the plate is held against accidental return to unfastening position by the yieldable finger 13.

It will also be noted, particularly in FIG. 7, that the crown of the molding is such that there is a substantial space above the plate like portion 3 but the fastener is held firmly and strongly in position on the inturned flanges 12—12 by the fingers 9 and 10. Therefore, when the snap fastener stud 15 is pressed through the aperture 17 in the support 1, the fingers and the plate like portion are structurally strong enough to overcome the pressure required to snap the stud 15 through the aperture 17 and the plate like portion of the fastening means is not backed up into this type of high crown molding.

While I have illustrated and described preferred embodiments of my invention, reference is particularly made to the following claims wherein my invention is best defined.

I claim:

1. A molding fastener assembly comprising, in combination, an apertured support, a molding for the support, and fastening means extending through the aperture of said support for attaching the molding to the support, said molding having reversely turned, inwardly extending side edge portions along its opposite edges in engagement with said support, each reversely turned edge portion having a flange portion at its free end extending inwardly in the direction of the other flange portion and in spaced relation to said support, said fastening means having a molding-engaging, elongated plate portion, the opposite ends of said plate portion in engagement with said molding each having at least one integral first finger portion and a pair of integral second finger portions lying in planes susbtantially parallel to and spaced from one another thereby defining an outwardly extending slot at each end thereof spaced from said support, said flange portions of said molding each being positioned within the respective formed slots of said elongated plate portion, and fastening element means secured at one end to said plate portion and extending through the aperture of said support to secure said plate and said molding in tight engagement to said support.

2. A molding fastener assembly comprising, in combination, an apertured support, a molding for the support, and fastening means extending through the aperture of said support for attaching the molding to the support, said molding having reversely turned, inwardly extending side edge portions along its opposite edges in engagement with said support, each reversely turned edge portion having a flange portion at its free end extending inwardly in the direction of the other flange portion and in spaced relation to said support, said fastening means having a molding-engaging, elongated plate portion, the opposite ends of said plate portion in engagement with said molding each having an integral center finger portion and a pair of integral side portions lying in planes susbtantially parallel to and spaced from one another thereby defining an outwardly extending slot at each end thereof spaced from said support, said flange portions of said molding each being positioned within the respective formed slots of said elongated plate portion, the outer corner edge of one of said side portions of one end of said elongated plate portion and the corner edge of the diametrically opposite side portion of the other end of said plate portion being arcuately shaped to be rotated into engagement with the flange portion of the molding form a position between the flange portions and to engage the molding to hold the plate portion in a given position, and fastening element means secured at one end to said plate portion and extending through the aperture of said support to secure said plate and said molding in tight engagement to said support.

3. A molding fastening assembly in accordance with claim 2, wherein a yieldable spring finger member is secured adjacent one side edge of said plate portion and extending therefrom in angled relationship thereto, with the opposite free end of said yieldable spring finger member in engagement with the inside face of one side edge of said molding to prevent said plate portion from accidentally turning to a released position from the molding.

References Cited in the file of this patent

UNITED STATES PATENTS

| | | |
|---|---|---|
| 890,285 | Krantz | June 9, 1908 |
| 2,180,925 | Dyresen | Nov. 21, 1939 |
| 2,653,687 | Churchill | Sept. 29, 1953 |
| 2,709,286 | Bedford | May 31, 1955 |

FOREIGN PATENTS

| | | |
|---|---|---|
| 974,654 | France | Oct. 4, 1950 |